(12) United States Patent
Shimoirisa (10) Patent No.: US 11,199,911 B2
(45) Date of Patent: Dec. 14, 2021

(54) SIGNATURE INPUT DEVICE, SETTLEMENT TERMINAL, AND SIGNATURE INPUT METHOD

(71) Applicant: TOSHIBA TEC KABUSHIKI KAISHA, Tokyo (JP)

(72) Inventor: Shinichi Shimoirisa, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 227 days.

(21) Appl. No.: 16/522,818

(22) Filed: Jul. 26, 2019

(65) Prior Publication Data
US 2020/0133404 A1 Apr. 30, 2020

(30) Foreign Application Priority Data
Oct. 24, 2018 (JP) .............................. JP2018-199819

(51) Int. Cl.
*G06F 3/0346* (2013.01)
*G06F 3/0354* (2013.01)
*G06Q 20/20* (2012.01)

(52) U.S. Cl.
CPC ........ *G06F 3/0346* (2013.01); *G06F 3/03545* (2013.01); *G06Q 20/204* (2013.01)

(58) Field of Classification Search
CPC .. G06F 3/0346; G06F 3/03545; G06Q 20/204
See application file for complete search history.

(56) References Cited

U.S. PATENT DOCUMENTS

| 6,486,874 | B1 | 11/2002 | Muthuswamy et al. |
| 6,618,504 | B1* | 9/2003 | Yoshino ............. G06K 9/00449 382/187 |
| 9,335,912 | B2* | 5/2016 | Kerr ....................... G06F 3/0485 |
| 9,459,794 | B1* | 10/2016 | Soegiono ............ G06F 3/04847 |
| 2005/0022124 | A1* | 1/2005 | Tunney ................. G06F 40/171 715/268 |
| 2010/0026642 | A1* | 2/2010 | Kim ...................... G06F 3/0416 345/173 |

(Continued)

FOREIGN PATENT DOCUMENTS

| JP | 2015-226183 | 12/2015 |
| JP | 2016-162057 | 9/2016 |

OTHER PUBLICATIONS

Extended European Search Report for European Patent Application No. 19193271.4 dated Mar. 20, 2020.

*Primary Examiner* — Shourjo Dasgupta
(74) *Attorney, Agent, or Firm* — Amin, Turocy & Watson, LLP (57) ABSTRACT

A signature input device according to an embodiment includes a sign pad configured to output an electronic signature, an input pen configured to input the electronic signature to the sign pad, a three-dimensional position acquisition sensor configured to acquire three-dimensional position information of the input pen, and a control section configured to determine, if the input pen is separated from the sign pad, whether an electronic signature input support instructing motion is included in the three-dimensional position information and, if the electronic signature input support instructing motion is included, perform electronic signature input support processing on the electronic signature.

17 Claims, 5 Drawing Sheets

(56) References Cited

U.S. PATENT DOCUMENTS

| | | | |
|---|---|---|---|
| 2010/0225443 A1* | 9/2010 | Bayram | H04W 12/068 340/5.83 |
| 2010/0245277 A1* | 9/2010 | Nakao | G06F 3/04883 345/173 |
| 2011/0309142 A1* | 12/2011 | Miller | G07G 1/0054 235/380 |
| 2012/0176332 A1* | 7/2012 | Fujibayashi | G06F 3/04883 345/173 |
| 2014/0313171 A1* | 10/2014 | Hong | G06F 1/1626 345/184 |
| 2014/0351071 A1* | 11/2014 | Hong | G06Q 20/363 705/20 |
| 2015/0293592 A1* | 10/2015 | Cheong | G06F 3/0416 345/173 |
| 2015/0317643 A1* | 11/2015 | Mian | H04W 12/10 705/317 |
| 2016/0054821 A1* | 2/2016 | Kim | G06F 3/03545 345/179 |
| 2016/0078277 A1 | 3/2016 | Sprigg et al. | |
| 2016/0197903 A1* | 7/2016 | Dease | H04L 63/08 726/5 |
| 2018/0129312 A1* | 5/2018 | Westhues | G06F 3/041661 |
| 2019/0018510 A1* | 1/2019 | Arai | G06F 21/32 |
| 2019/0348983 A1* | 11/2019 | Edgar | G06F 3/016 |
| 2019/0369752 A1* | 12/2019 | Ikeda | G02B 27/017 |

\* cited by examiner

SIGNATURE INPUT DEVICE, SETTLEMENT TERMINAL, AND SIGNATURE INPUT METHOD

CROSS-REFERENCE TO RELATED APPLICATION

This application is based upon and claims the benefit of priority from Japanese Patent Application No. 2018-199819, filed in Oct. 24, 2018, the entire contents of which are incorporated herein by reference.

FIELD

Embodiments described herein relate generally to a signature input device, a settlement terminal, and a signature input method.

BACKGROUND

Various settlement terminals represented by a card settlement terminal, which performs settlement with a credit card, read credit card information from the credit card and output a settlement slip of the credit card. A signature of an owner of the credit card is written on the settlement slip.

An electronic signature has started to be introduced in order to save labor and time for printing settlement slips and sending signed settlement slips to credit card companies.

A signature input device or the like including a signature pad and an input pen is used for input of the electronic signature. A touch pad of a capacitance type, a decision button for deciding signature input, and a cancellation button for cancelling the signature input are provided in the signature pad. A user draws a signature on the touch pad with the input pen to input an electronic signature and presses the decision button or the cancellation button with a finger to perform processing of decision or cancellation of the input electronic signature.

DESCRIPTION OF THE DRAWINGS

FIGS. 5A and 5B are conceptual diagrams illustrating an electronic signature and an input supporting motion.

DETAILED DESCRIPTION

An object of embodiments is to provide a signature input device, a settlement terminal, a program, and a signature input method that can support signature input with simple operation.

A signature input device according to an embodiment includes: a sign pad configured to receive an electronic signature; an input pen configured to input the electronic signature to the sign pad; a three-dimensional position acquisition sensor configured to acquire three-dimensional position information of the input pen; and a control section configured to determine, if the input pen is separated from the sign pad, whether an electronic signature input support instructing motion is included in the three-dimensional position information and, if the electronic signature input support instructing motion is included, perform electronic signature input support processing on the electronic signature.

In the signature input device according to the embodiment, the electronic signature input support instructing motion may be a motion for drawing a circle larger than the electronic signature, and the electronic signature input support processing may be decision processing for the electronic signature.

In the signature input device according to the embodiment, the electronic signature input support instructing motion may be a motion for drawing a straight line larger than the electronic signature, and the electronic signature input support processing may be cancellation processing for the electronic signature.

A settlement terminal according to an embodiment includes: a card reading section configured to read card information stored in a credit card; a payment-amount receiving section configured to receive input of a payment amount; and the signature input device according to the embodiment.

A program according to an embodiment causes a computer to function as: electronic-signature generating means for generating an electronic signature from a plurality of kinds of position information received from a sign pad; storage controlling means for causing a storing section to store the electronic signature generated by the electronic-signature generating means; and electronic signature input support processing means for determining whether an electronic signature input support instructing motion is included in three-dimensional position information received from a three-dimensional position acquisition sensor incorporated in an input pen and performing electronic signature input support processing on the electronic signature if the electronic signature input support instructing motion is included.

A signature input method according to an embodiment includes: receiving an electronic signature with a sign pad; acquiring three-dimensional position information of an input pen that inputs the electronic signature to the sign pad; and determining, if the input pen is separated from the sign pad, whether an electronic signature input support instructing motion is included in the three-dimensional position information and, if the electronic signature input support instructing motion is included, performing electronic signature input support processing on the electronic signature.

A signature input device and a settlement terminal according to an embodiment are explained below with reference to the drawings. In the figures, the same components are denoted by the same reference numerals and signs.

Figure 1:
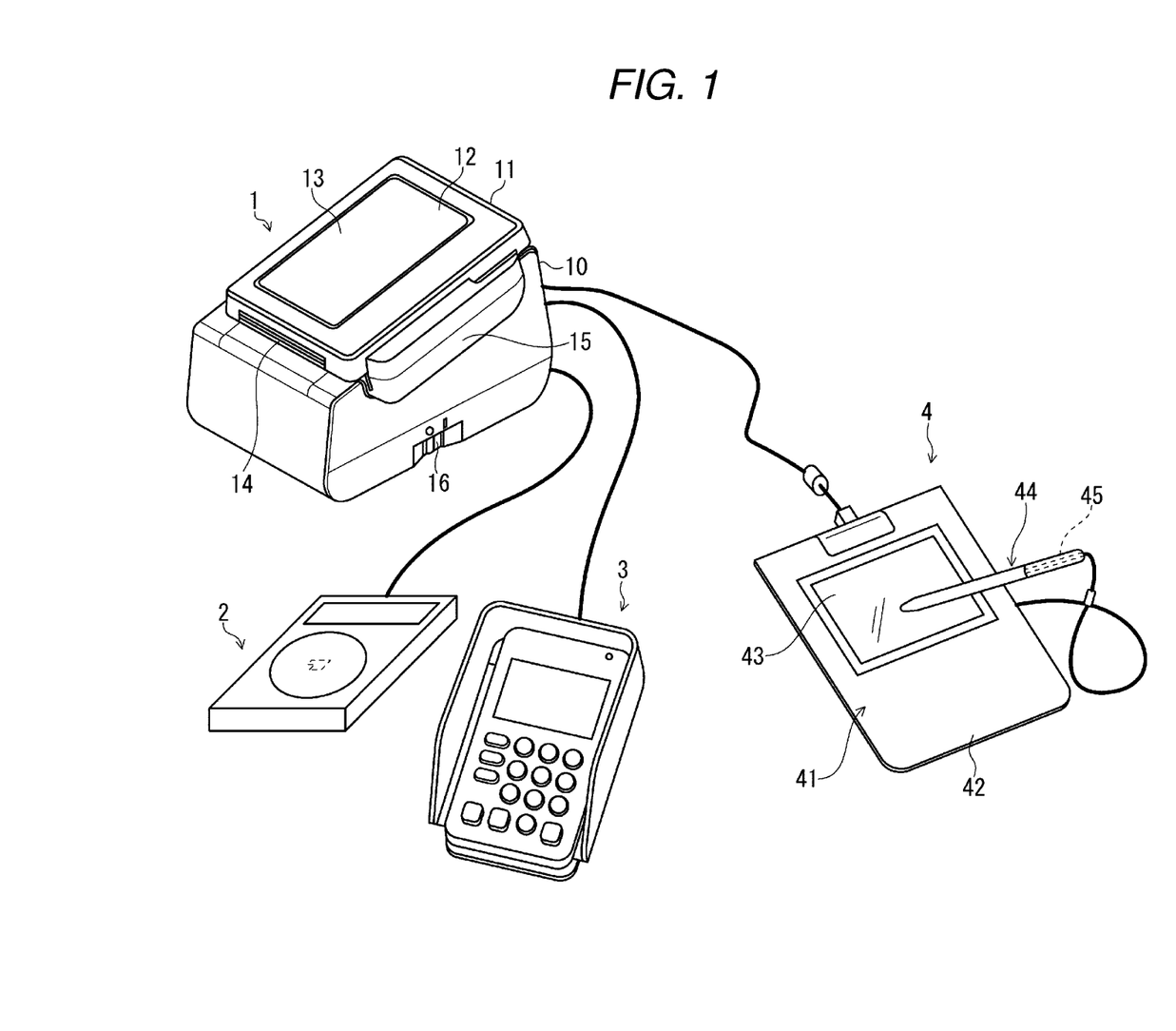
FIG. 1 is a perspective view illustrating a configuration example of a settlement terminal according to an embodiment.

FIG. 1 is a perspective view illustrating a configuration example of a settlement terminal 1 according to the embodiment.

The settlement terminal 1 includes a power switch 16 on a side of a main body 10. The settlement terminal 1 includes, above the main body 10, an upper surface panel 11 openable and closable with respect to the main body 10. In the settlement terminal 1, a roll-like receipt sheet can be set on the inside of the main body 10 if the upper surface panel 11 is opened. The upper surface panel 11 includes a display section 12 on which a touch panel, which is an operation section 13, is provided. The display section 12 is, for example, a liquid crystal display.

The settlement terminal 1 includes, in a side upper part of the main body 10, a card reading section 15 that reads, from a settlement card for settlement, information stored in the settlement card.

The settlement terminal 1 includes, on the inside of the main body 10, a printing section 57 (see FIG. 2) that prints information concerning settlement, a sales report, and the like on the receipt sheet. The receipt sheet after the printing is issued from a receipt issue port 14 provided between the main body 10 and the upper surface panel 11.

Figure 2:
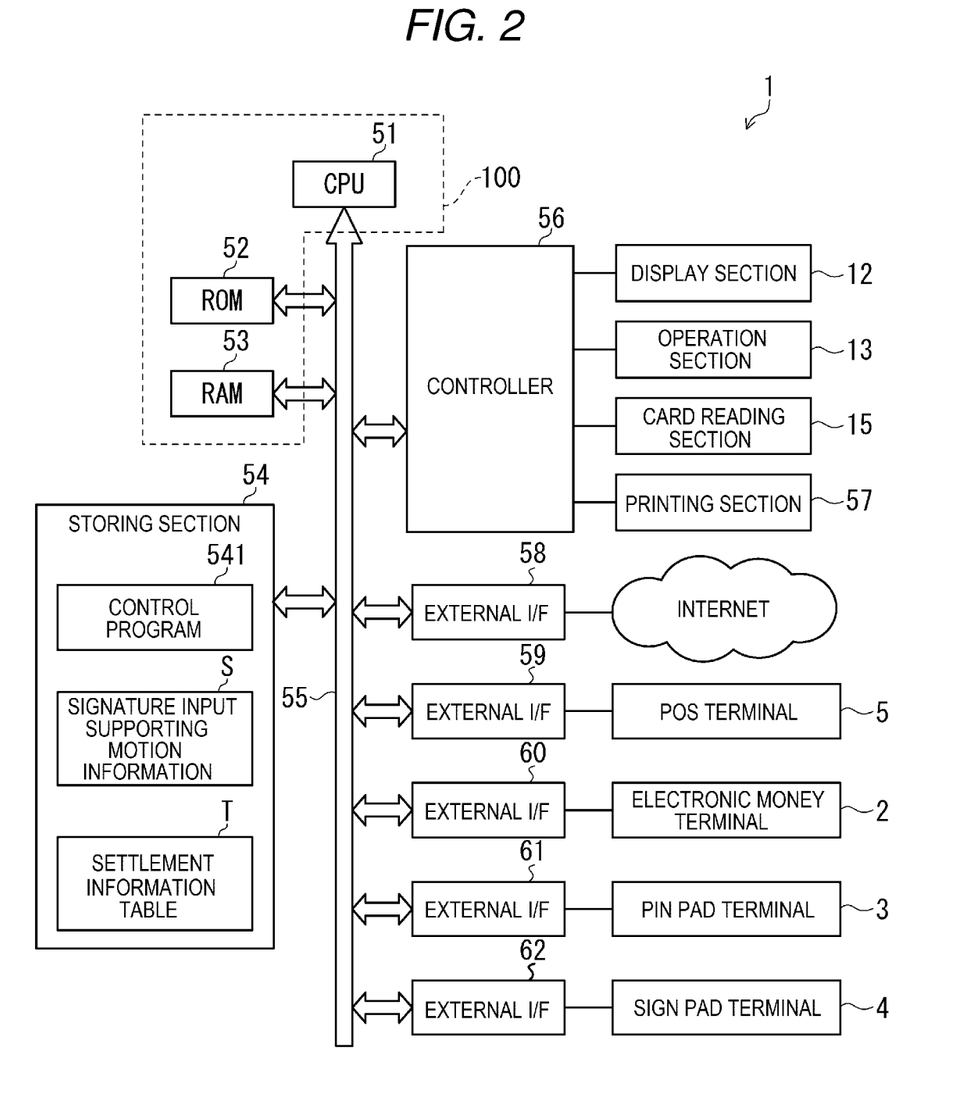
FIG. 2 is a block diagram illustrating a hardware configuration of the settlement terminal.

FIG. 2 is a block diagram illustrating a hardware configuration of the settlement terminal 1.

The settlement terminal 1 includes a control section 100 for controlling sections. The control section (a computer) 100 includes a CPU (Central Processing Unit) 51 that centrally controls the sections, a ROM (Read Only Memory) 52, and a RAM (Random Access Memory) 53. The CPU 51 is connected to the ROM 52 and the RAM 53 via a bus line 55 such as an address bus or a data bus.

The CPU 51 of the control section 100 develops, on the RAM 53, a computer program stored in the ROM 52 or a storing section 54. The CPU 51 operates according to the computer program developed on the RAM 53 to control the settlement terminal 1. The control section 100 is connected to the storing section 54, a controller 56, and external I/Fs (Interfaces) 58, 59, 60, 61, and 62 via the bus line 55.

The storing section 54 is a nonvolatile memory such as a flash memory in which stored information is retained even if a power supply is turned off. The storing section 54 stores computer programs and the like including a control program 541. The control program 541 is, for example, a settlement program used during settlement processing of the settlement terminal 1.

The controller 56 is connected to the display section 12, the operation section 13, the printing section 57, and the card reading section 15. The controller 56 executes various kinds of control based on commands from the control section 100. The display section 12 displays various kinds of information including an image of keys for operating the settlement terminal 1. For example, the keys are a change candidate key and the like explained below. The operation section (a payment-amount receiving section) 13 is the touch panel provided on the display section 12. If the touch panel is touched in positions corresponding to the keys displayed on the display section 12, the operation section 13 receives various kinds of key operation.

The printing section 57 includes a platen roller and a printing head. The platen roller rotates to draw out the receipt sheet stored on the inside of the main body 10 and conveys the receipt sheet. The printing head is, for example, a thermal head. The printing head prints, for example, details of commodities purchased by a customer on the receipt sheet conveyed by the platen roller. The card reading section 15 reads magnetically stored card information.

The external I/F 58 is connected to a center server and the like via a wired or wireless communication line (e.g., the Internet or a LAN (Local Area Network)).

The external I/Fs 59, 60, 61, and 62 are connected to an external device.

The external I/F 59 is used for connection to the POS terminal 5.

The external I/F 60 is used for connection to an electronic money terminal 2. The electronic money terminal 2 reads card information from a noncontact IC card.

The external I/F 61 is used for connection to a pin pad terminal 3. The pin pad terminal 3 reads card information from a credit card, a debit card, and the like.

The external I/F 62 is used for connection to a sign pad terminal 4. The sign pad terminal 4 acquires an electronic signature of an owner of the settlement card.

The settlement terminal 1 transmits and receives various kinds of information to and from the electronic money terminal 2, the pin pad terminal 3, the signature or sign pad terminal 4, and the POS terminal 5 via the external I/Fs 59, 60, 61, and 62.

The settlement terminal 1 reads card information from the settlement card via the electronic money terminal 2, the pin pad terminal 3, or the card reading section 15 and uses the card information for settlement.

The settlement terminal 1 acquires a signature (an electronic signature) of the owner of the settlement card via the sign pad terminal 4 and uses the signature for settlement.

The sign pad terminal 4 includes a sign pad 41 and an input pen 44.

The sign pad 41 includes a flat main body 42 and an input panel 43 disposed on the upper surface of the main body 42. The input panel 43 is a capacitance-type panel. The input panel 43 outputs position information of a place (a point) pressed by the input pen 44.

The input pen 44 is a pen for drawing a signature on the input panel 43 and inputting the signature.

The sign pad 41 outputs, as an electronic signature, track information at the time when the signature is drawn on the input panel 43 by the input pen 44.

An acceleration sensor 45 is incorporated in the input pen 44. The acceleration sensor (a three-dimensional position acquisition sensor) 45 outputs three-dimensional position information of the input pen 44.

The settlement card is a card used for settlement by a credit card, a debit card, and a noncontact IC card. The settlement card includes a storage medium storing, as information for enabling the settlement, for example, identification information for identifying the settlement card. The settlement terminal 1 can specify a customer and perform settlement by reading the identification information.

The storing section 54 stores a settlement information table T, signature input supporting motion information S, and the like.

Settlement information stores, for example, as input information, settlement identification information, a card brand, commodity information, an amount, and an electronic signature. The settlement identification information is identification information capable of identifying settlement. The card brand is a brand of the settlement card used for settlement. The commodity information is identification information capable of identifying a purchase target commodity, service, or the like. The amount is an amount (a payment amount) of the purchase target commodity, service, or the like. The electronic signature is information obtained by electronizing a signature input from the sign pad terminal 4 by the owner of the settlement card.

The signature input supporting motion information S is signature deciding motion information and signature cancelling motion information.

The signature deciding motion information is three-dimensional position information of a motion for deciding the electronic signature. Specifically, the signature deciding motion information is three-dimensional position information of a motion for repeatedly drawing a circle larger than the electronic signature or the area of the input panel 43.

The signature cancelling motion information is three-dimensional position information of a motion for cancelling the electronic signature. Specifically, the signature cancelling motion information is three-dimensional position information of a motion for repeatedly drawing, to the left and the right, a straight line larger than the electronic signature or the width of the input panel 43. Alternatively, the signature cancelling motion information is three-dimensional position information of a motion for drawing an "X" over the electronic signature.

Control of the settlement terminal 1 according to the embodiment is explained.

Figure 3:
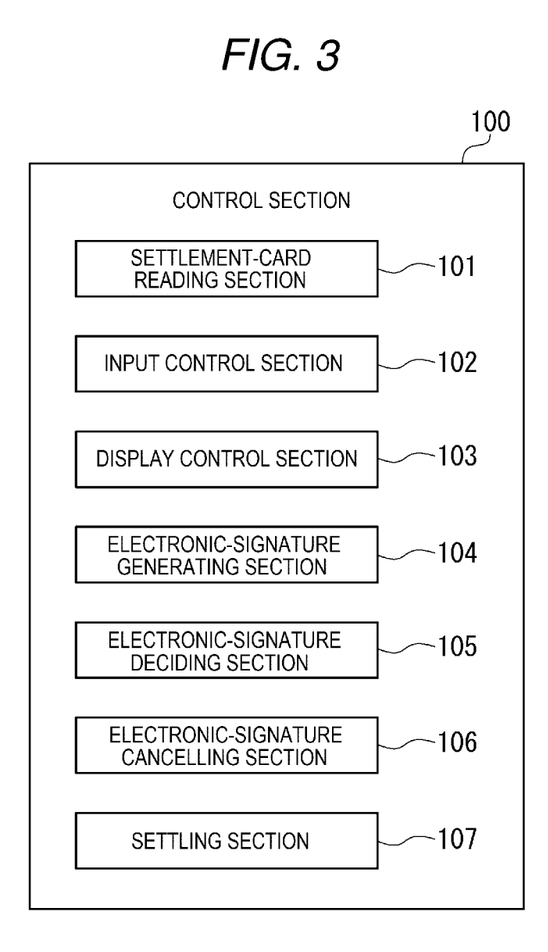
FIG. 3 is a functional block diagram illustrating a functional configuration of the settlement terminal.

FIG. 3 is a functional block diagram illustrating a functional configuration of the settlement terminal 1.

The control section 100 of the settlement terminal 1 operates according to the computer programs such as the control program 541 stored in the storing section 54 to function as a settlement-card reading section 101, an input control section 102, a display control section 103, an electronic-signature generating section 104, an electronic-signature deciding section 105, an electronic-signature cancelling section 106, and a settling section 107.

The settlement-card reading section 101 reads card information from the settlement card via the card reading section 15. The card information is information with which settlement can be performed using a card. The card information is, for example, identification information capable of identifying a customer and a card.

The input control section 102 receives input of various kinds of key operation via the operation section 13, which is the touch panel provided on the display section 12. Consequently, the input control section 102 receives input of settlement information concerning settlement processing related to one transaction. More in detail, the input control section 102 receives input for selecting a card brand of the settlement card, input of commodity information, and the like. The input control section 102, which is storage control means, causes the storing section 54 to store a plurality of kinds of information input in processes in the settlement information of the settlement information table T.

The display control section 103 displays various kinds of information on the display section 12.

The electronic-signature generating section 104, which is electronic-signature generating means, interpolates a plurality of kinds of position information input from the sign pad terminal 4 and generates an electronic signature.

The electronic-signature deciding section 105, which is first electronic signature input support processing means, receives three-dimensional information from the acceleration sensor 45 incorporated in the input pen 44. The electronic-signature deciding section 105 determines whether the three-dimensional information is a motion for deciding the electronic signature. If the three-dimensional information is the motion for deciding the electronic signature, the electronic-signature deciding section 105 causes the storing section 54 to store the three-dimensional information in the settlement information of the settlement information table T.

The electronic-signature cancelling section 106, which is second electronic signature input support processing means, receives the three-dimensional information from the acceleration sensor 45 incorporated in the input pen 44. The electronic-signature cancelling section 106 determines whether the three-dimensional information is a motion for cancelling the electronic signature. If the three-dimensional information is the motion for cancelling the electronic signature, the electronic-signature cancelling section 106 erases (deletes) the electronic signature generated by the electronic-signature generating section 104.

The settling section 107, which is settling means, executes settlement related to one transaction using the settlement information stored in the settlement information table T.

Processing for inputting an electronic signature using the sign pad terminal 4 connected to the settlement terminal 1 is explained.

Figure 4:
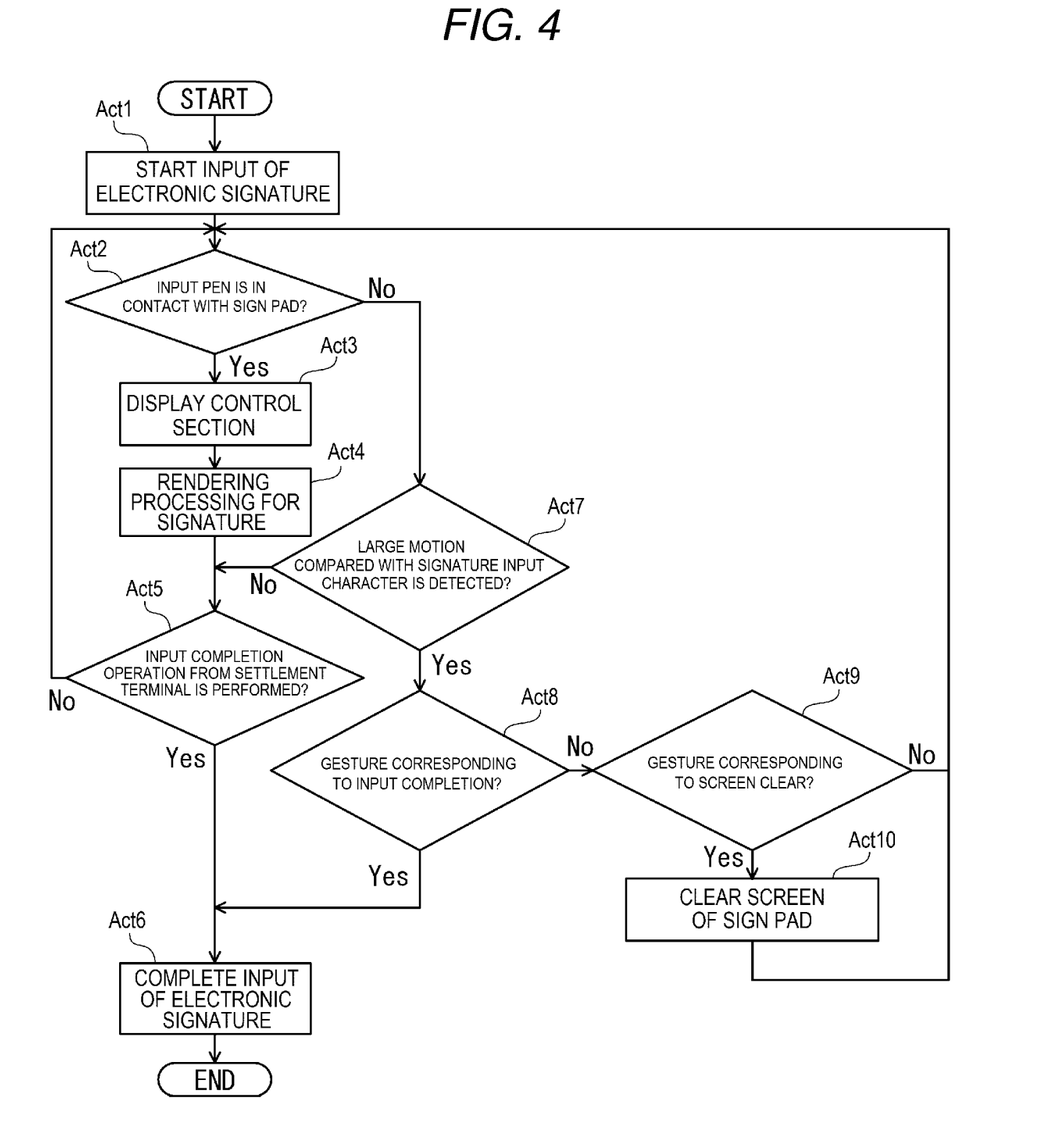
FIG. 4 is a flowchart illustrating signature input processing.

FIG. 4 is a flowchart illustrating signature input processing.

Figure 5A:
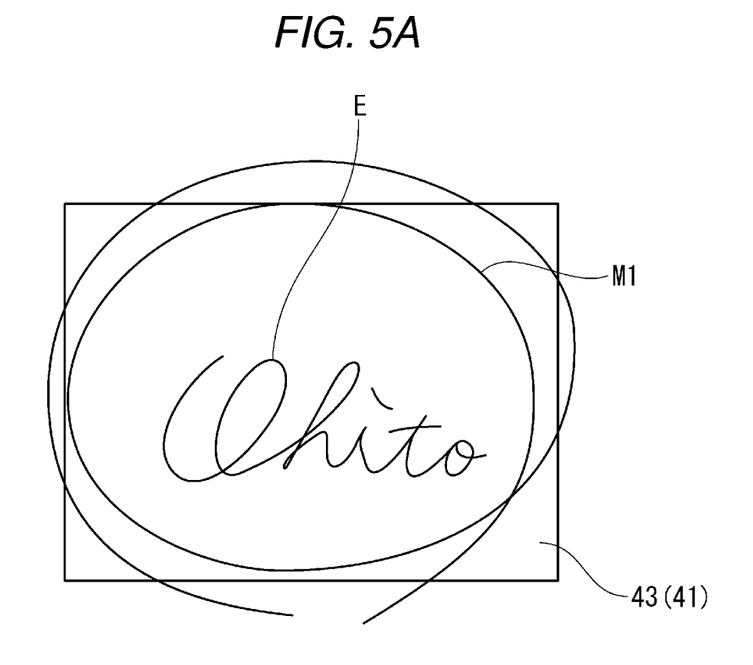
FIG. 5A illustrating an electronic signature deciding motion and FIG. 5B illustrating an electronic signature cancelling motion.
Figure 5B:
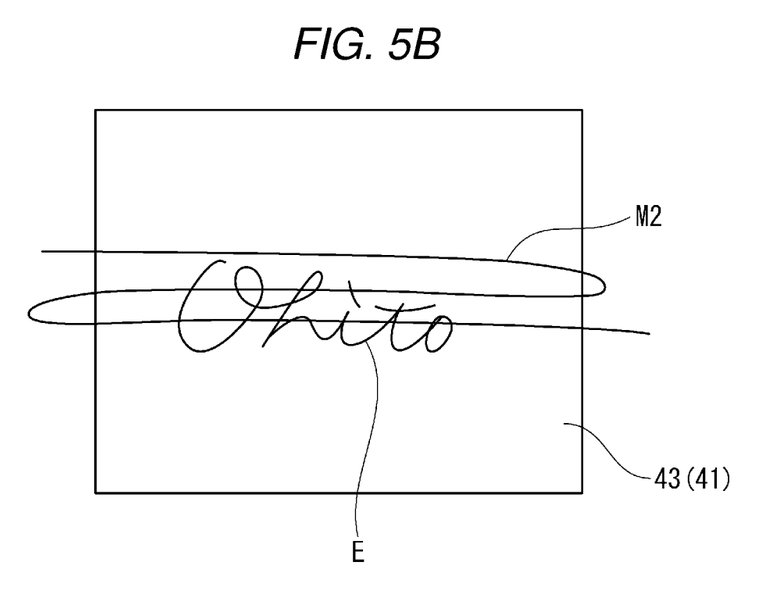

FIGS. 5A and 5B are conceptual diagrams illustrating an electronic signature and an input supporting motion: FIG. 5A illustrating an electronic signature deciding motion and FIG. 5B illustrating an electronic signature cancelling motion.

Prior to the signature input processing, settlement processing for settling one transaction using the settlement terminal 1 is performed.

An operator of the settlement terminal 1 performs various kinds of key operation and inputs settlement information via the operation section 13 (the touch panel) provided in the display section 12. Further, the operator of the settlement terminal 1 inserts the settlement card through the card reading section 15 and causes the card reading section 15 to read card information from the settlement card.

Consequently, the control section 100 receives input of settlement information concerning the settlement processing concerning one transaction. More in detail, the control section 100 causes the storing section 54 to store the commodity information and the card information in the settlement information table T of the storing section 54.

The card information is information with which settlement can be performed using a card. The card information is, for example, identification information capable of identifying a customer or a card.

Subsequently, input processing for an electronic signature is performed. The sign pad 41 is set in an input waiting state. The owner of the settlement card starts input of an electronic signature E using the sign pad terminal 4 (Act 1).

First, the control section 100 determines whether the input pen 44 is in contact with the input panel 43 of the sign pad 41 (Act 2). The control section 100 determines whether an output signal from the input panel 43 is present.

If an output signal from the input panel 43 is present, the control section 100 performs coordinate acquisition processing (Act 3). The control section 100 acquires, at a fixed time interval, position information of a place (a point) where the input pen 44 touches the input panel 43. Further, the control section 100 performs rendering processing for interpolating a plurality of kinds of position information obtained from the input panel 43 (Act 4).

The control section 100 determines whether input completion operation is performed from the settlement terminal 1 in Acts 2 to 4 (Act 5).

Consequently, the control section 100 creates the electronic signature E from a track obtained by the owner of the settlement card drawing a signature on the input panel 43 with the input pen 44. The electronic signature E is stored in the storing section 54.

If determining in Act 5 that the input completion operation is performed from the settlement terminal 1, the control section 100 ends the input of the electronic signature E performed using the sign pad terminal 4 (Act 6).

On the other than, if determining in Act 5 that the input completion operation is not performed from the settlement terminal 1, the control section 100 returns to Act 2.

If determining in Act 2 that the input pen 44 separates from the input panel 43, the control section 100 acquires the three-dimensional position information from the acceleration sensor 45 incorporated in the input pen 44. If the output signal from the input panel 43 stops, the control section 100 acquires the three-dimensional position information from the acceleration sensor 45.

The control section 100 determines whether the three-dimensional position information from the acceleration sensor 45 is large position information compared with the electronic signature E (Act 7). For example, if the electronic signature E is rendering information 20 mm in length and 100 mm in width, the control section 100 determines whether the three-dimensional position information from the acceleration sensor 45 is position information 40 mm or more in length and 120 mm or more in width. The control section 100 desirably determines whether the three-dimensional position information from the acceleration sensor 45 is position information larger than the longitudinal and lateral lengths of the input panel 43.

If determining in Act 7 that the three-dimensional position information from the acceleration sensor 45 is small position information compared with the electronic signature E, the control section 100 returns to Act 5.

On the other hand, if determining in Act 7 that the three-dimensional position information from the acceleration sensor 45 is large position information compared with the electronic signature E, the control section 100 performs the following processing (Acts 8 to 10).

In Acts 8 to 10, the control section 100 determines and executes input completion or input cancellation of the electronic signature E.

First, in Act 8, the control section 100 determines whether the three-dimensional position information from the acceleration sensor 45 corresponds to a motion of input decision of the electronic signature E. The control section 100 determines whether the three-dimensional position information from the acceleration sensor 45 coincides with the signature input supporting motion information S of the storing section 54. Specifically, the control section 100 determines whether the three-dimensional position information from the acceleration sensor 45 corresponds to a motion M1 for repeatedly drawing a large circle (see FIG. 5A).

If determining in Act 8 that the three-dimensional position information from the acceleration sensor 45 corresponds to the motion M1 of the input completion of the electronic signature E, the control section 100 shifts to Act 6 and ends the input of the electronic signature E performed using the sign pad terminal 4.

On the other hand, if determining in Act 8 that the three-dimensional position information from the acceleration sensor 45 does not correspond to the motion M1 of the input completion of the electronic signature E, the control section 100 determines whether the three-dimensional position information from the acceleration sensor 45 corresponds to a motion M2 of input cancellation of the electronic signature E (Act 9).

In Act 9, the control section 100 determines whether the three-dimensional position information from the acceleration sensor 45 corresponds to the motion M2 of the input cancellation of the electronic signature E. The control section 100 determines whether the three-dimensional position information from the acceleration sensor 45 coincides with the signature input supporting motion information S of the storing section 54. Specifically, the control section 100 determines whether the three-dimensional position information from the acceleration sensor 45 corresponds to the motion M2 for repeatedly drawing a straight line to the left and the right (see FIG. 5B).

If determining in Act 9 that the three-dimensional position information from the acceleration sensor 45 corresponds to the motion M2 of the input cancellation of the electronic signature E, the control section 100 erases (deletes) the electronic signature E stored in the storing section 54. The control section 100 returns to Act 2.

On the other hand, if determining in Act 8 that the three-dimensional position information from the acceleration sensor 45 does not correspond to the motion M2 of the input cancellation of the electronic signature E, the control section 100 immediately returns to Act 2.

In this way, the electronic signature E is decided and stored in the settlement information table T of the storing section 54. The settlement terminal 1 transmits the information stored in the settlement information table T to the center server or the like via the external I/F 58.

As explained above, the settlement terminal 1 (the sign pad terminal 4) supports the input of the electronic signature E. If the input pen 44 separates from the sign pad 41, the settlement terminal 1 determines whether the electronic signature input support instructing motion (M1 or M2) is included in the three-dimensional position information from the acceleration sensor 45. If the electronic signature input support instructing motion is included, the settlement terminal 1 performs the electronic signature input support processing on the electronic signature E input to the sign pad 41.

Consequently, the owner of the settlement card can instruct decision and cancellation of the electronic signature E without shifting the input pen 44 from one hand to the other or pressing the operation button.

The electronic signature input support instructing motion is the motion M1 for drawing a circle larger than the electronic signature E. The electronic signature input support processing is the decision processing for the electronic signature E. The electronic signature input support instructing motion is the motion M2 for drawing a straight line larger than the electronic signature E. The electronic signature input support processing is the cancellation processing for the signature E. Therefore, it is possible to instruct decision and cancellation of the electronic signature E with a simple motion.

In the above explanation in the embodiment, the sign pad terminal 4 is connected to the settlement terminal 1. However, not only this, but, for example, the sign pad terminal 4 may be incorporate in the settlement terminal 1, that is, an electronic signature may be drawn on the display section 12 of the operation section 13.

The settlement terminal 1 may be incorporate in the POS terminal 5. The sign pad terminal 4 may be incorporated in a notebook personal computer or a tablet terminal, that is, an electronic signature may be drawn on a display, a touch pad, or the like.

The acceleration sensor 45 is not limited to be incorporated in the input pen 44. The acceleration sensor 45 may be incorporated in another input device.

Examples of the other input device include wearable terminals of a finger ring type and a bracelet type. The wearable terminals may be worn on a hand and the like. Three-dimensional position information may be obtained from acceleration sensors incorporated in the wearable terminals.

A three-dimensional camera may be used instead of the acceleration sensor 45.

The electronic signature input support instructing motion is not limited to the motion for drawing a large circuit and the motion for drawing a large straight line. The electronic signature input support instructing motion can be optionally set.

The electronic signature input support processing is not limited to the decision or the cancellation of an electronic signature. The electronic signature input support processing may be copying, pasting, partial deletion, and the like.

The three-dimensional position acquisition sensor is not limited to the acceleration sensor 45. For example, two CCD cameras may be disposed on the upper surface of the main body 42 of the sign pad 41. Three-dimensional position information of the input pen 44 may be calculated from a parallax of images of the two CCD cameras.

The embodiments of the present invention are presented as examples and are not intended to limit the scope of the invention. The new embodiments can be implemented in other various forms. Various omissions, substitution, and changes can be made without departing from the spirit of the invention. These embodiments and modifications of the embodiments are included in the scope and the gist of the invention and included in the inventions described in claims and the scope of equivalents of the inventions.

What is claimed is:

1. A signature input device, comprising:
  a signature pad configured to receive an electronic signature;
  an input pen configured to input the electronic signature to the signature pad;
  a three-dimensional position acquisition sensor configured to acquire three-dimensional position information of the input pen; and
  a processor configured to determine, if the input pen is separated from the signature pad, whether an electronic signature input support instructing motion is included in the three-dimensional position information and, if the electronic signature input support instructing motion is included, perform electronic signature input support processing on the electronic signature, wherein
  the electronic signature input support instructing motion is a motion for drawing a circle larger than the electronic signature, and
  the electronic signature input support processing is decision processing for the electronic signature.

2. The device according to claim 1, wherein
  the electronic signature input support instructing motion is a motion for drawing a straight line larger than the electronic signature, and
  the electronic signature input support processing is cancellation processing for the electronic signature.

3. The device according to claim 2, wherein
  the motion for drawing the straight line has a length longer than a length of the electronic signature.

4. The device according to claim 1, wherein
  the electronic signature input support instructing motion is a motion for drawing an "X" over the electronic signature, and
  the electronic signature input support processing is cancellation processing for the electronic signature.

5. The device according to claim 1, wherein
  the input pen comprises an acceleration sensor.

6. The device according to claim 1, wherein
  the signature pad comprises a liquid crystal display.

7. A settlement terminal, comprising:
  a card reading section configured to read card information stored in a credit card;
  a payment-amount receiving section configured to receive input of a payment amount; and
  a signature input device, comprising:
    a signature pad configured to receive an electronic signature;
    an input pen configured to input the electronic signature to the signature pad;
    a three-dimensional position acquisition sensor configured to acquire three-dimensional position information of the input pen; and
    a processor configured to determine, if the input pen is separated from the signature pad, whether an electronic signature input support instructing motion is included in the three-dimensional position information and, if the electronic signature input support instructing motion is included, perform electronic signature input support processing on the electronic signature, wherein
  the electronic signature input support instructing motion is a motion for drawing a circle larger than the electronic signature, and
  the electronic signature input support processing is decision processing for the electronic signature.

8. The settlement terminal according to claim 7, wherein
  the electronic signature input support instructing motion is a motion for drawing a straight line larger than the electronic signature, and
  the electronic signature input support processing is cancellation processing for the electronic signature.

9. The settlement terminal according to claim 8, wherein
  the motion for drawing the straight line has a length longer than a length of the electronic signature.

10. The settlement terminal according to claim 7, wherein
  the electronic signature input support instructing motion is a motion for drawing an "X" over the electronic signature, and
  the electronic signature input support processing is cancellation processing for the electronic signature.

11. The settlement terminal according to claim 7, wherein
  the input pen comprises an acceleration sensor.

12. The settlement terminal according to claim 7, wherein
  the signature pad comprises a liquid crystal display.

13. A signature input method, comprising:
  receiving an electronic signature with a signature pad;
  acquiring three-dimensional position information of an input pen that inputs the electronic signature to the signature pad; and
  determining, by a device comprising a processor, if the input pen is separated from the signature pad, whether an electronic signature input support instructing motion is included in the three-dimensional position information and, if the electronic signature input support instructing motion is included, performing electronic signature input support processing on the electronic signature, wherein
  the electronic signature input support instructing motion is a motion for drawing a circle larger than the electronic signature, and
  the electronic signature input support processing is decision processing for the electronic signature.

14. The method according to claim 13, wherein
  the electronic signature input support instructing motion is a motion for drawing a straight line larger than the electronic signature, and
  the electronic signature input support processing is cancellation processing for the electronic signature.

15. The method according to claim 14, wherein
  the motion for drawing the straight line has a length longer than a length of the electronic signature.

16. The method according to claim 13, wherein
the electronic signature input support instructing motion is a motion for drawing an "X" over the electronic signature, and
the electronic signature input support processing is cancellation processing for the electronic signature.

17. The method according to claim 13, wherein
acquiring three-dimensional position comprises using an acceleration sensor.

\* \* \* \* \*